United States Patent Office 3,804,746
Patented Apr. 16, 1974

3,804,746
HYDROCARBON CONVERSION USING CRYSTALLINE ZEOLITE ZSM-11 CATALYST
Pochen Chu, Woodbury, N.J., assignor to
Mobil Oil Corporation
No Drawing. Original application April 23, 1970, Ser.
No. 31,421, now Patent No. 3,709,979. Divided and
this application May 18, 1972, Ser. No. 254,800
Int. Cl. B01j 9/20; C01b 33/28; C10g 13/02
U.S. Cl. 208—111                                    6 Claims

ABSTRACT OF THE DISCLOSURE

Crystalline zeolite ZSM-11 is disclosed as a useful catalyst for a wide variety of hydrocarbon conversion processes, including cracking, hydrocracking, reforming, hydroisomerization, olefin isomerization, hydrogenation-dehydrogenation and desulfurization reactions. The family of ZSM-11 crystalline zeolites are characterized by a cation of a quaternary metal.

RELATED APPLICATION

This application is a divisional of Ser. No. 31,421, filed Apr. 23, 1970, now U.S. Pat. 3,709,979.

BACKGROUND OF THE INVENTION

Field of the invention

This invention relates to novel crystalline zeolite compositions especially to novel crystalline aluminosilicates, to methods for their preparation and to organic compound conversion, especially hydrocarbon conversion, therewith.

DISCUSSION OF THE PRIOR ART

Zeolitic materials, both natural and synthetic, have been demonstrated in the past to have catalytic capabilities for various types of hydrocarbon conversion reactions, especially catalytic cracking. Certain of these zeolitic materials comprise ordered porous crystalline aluminosilicates having a definite crystalline structure, as determined by X-ray diffraction, within which there are a large number of small cavities which are inter-connected by a series of still smaller channels or pores. These cavities and pores are precisely uniform in size within a specific zeolitic material. Since the dimensions of these pores are such as to accept for adsorption molecules of certain dimensions while rejecting those of larger dimensions, these materials have come to be known as "molecular sieves," and are utilized in a variety of ways to take advantage of the adsorptive properties of these compositions.

These molecular sieves include a wide variety of positive ion-containing crystalline aluminosilicates, both natural and synthetic. Among the synthetic zeolites are those known as A, Y, L, D, R, S, T, Z, E, F, Q, B, X. All can generally be described as having a rigid 3-dimensional network of $SiO_4$ and $AlO_4$, in which the tetrahedra are cross-linked by the sharing of oxygen atoms whereby the ratio of the total aluminum and silicon atoms to oxygen atoms is 1:2. The electrovalence of the tetrahedra containing aluminum is negatively charged and the composition is balanced by the inclusion in the crystal structure of a cation for example, an alkali metal or an alkaline earth metal cation. Thus, a univalent positive sodium cation balances one negatively charged aluminosilicate tetrahedra. Where an alkaline earth metal cation is employed in the crystal structure of an aluminosilicate, it balances two negatively charged aluminosilicate tetrahedra because of its doubly positive valence. Other compositions in the aluminosilicate family contain both double positive cations, e.g., calcium and univalent positive cations, e.g. sodium, and are prepared, for example, by base exchanging a sodium aluminosilicate with a calcium compound solution such that not all of the sodium ions are removed. By means of such cation exchange, it has been possible to vary the size of the pores in the given aluminosilicate by suitable selection of the particular cation. The spaces between the tetrahedra are occupied by molecules of water prior to dehydration.

SUMMARY OF THE INVENTION

Broadly, this invention contemplates a new zeolite which can be identified, in terms of mole ratios of oxides, as follows:

$$0.9 \pm 0.3 M_{2/n}O : W_2O_3 : 20 \text{ to } 90 YO_2 : zH_2O$$

wherein M is a cation, n is the valence of said cation, W is selected from the group consisting of aluminum and gallium, Y selected from the group consisting of silicon and germanium and z is from 6 to 12, said zeolite having the X-ray diffraction pattern of Table 1 of the specification. In the as synthesized form, the zeolite has a formula, in terms of mole ratios of oxides, as follows:

$$0.9 \pm 0.3 M_{2/n}O : W_2O_3 : 20 \text{ to } 90 YO_2 zH_2O$$

wherein M is a mixture of at least one of the quaternary cations of a group 5A element of the Periodic Table and alkali metal cations, especially sodium. The original cations can be present so that the amount of quaternary metal cations is between 10 and 90 percent of the total amount of the original cations. Thus, the zeolite can be expressed by the following formula, in terms of mole ratios of oxides, as follows:

$$0.9 \pm 0.3 [xXR_4 + 1 - xM_{2/n}O] : W_2O_3 : 20 \text{ to } 90 YO_2 : zH_2O$$

wherein W and Y have the previously assigned significance, R is an alkyl or aryl group having between 1 and 7 carbon atoms, M is an alkali metal cation, X is a group 5A element, especially a metal, and X is between 0.1 and 0.9. The new zeolite is designated as ZSM-11.

The original cations can be replaced, at least in part, by ion exchange with another cation. Preferably, the other cation is one in which that form of the exchanged zeolite is catalytically active. Thus, the original cations are exchanged into a hydrogen or hydrogen ion precursor form or a form in which the original cation has been replaced by a metal of groups 2 through 8 of the Periodic Table. Thus, it is contemplated to exchange the original cations with alkylammonium, e.g. tetramethylammonium, arylammonium, metals, ammonium and hydrogen. Preferably, preferred cations of the zeolite are those wherein, in that cationic form, the zeolite has a good catalytic activity especially for hydrocarbon conversion. These include, in particular, hydrogen, rare earth metals, aluminum, metals of groups II and VIII of the Periodic Table and manganese.

Catalytically-active members of the family of zeolites disclosed and claimed herein have a definite X-ray diffraction pattern which distinguishes them from other zeolites. The X-ray diffraction pattern of the zeolite of the present invention has the following values:

TABLE 1

| Interplanar spacing $d$ (A.) | Relative intensity |
|---|---|
| 11.2±.2 | m. |
| 10.1±.2 | m. |
| 6.73±.2 | w. |
| 5.75±.1 | w. |
| 5.61±.1 | w. |
| 5.03±.1 | w. |
| 4.62±.1 | w. |
| 4.39±.08 | w. |
| 3.86±.07 | v.s. |
| 3.73±.07 | m. |
| 3.49±.07 | w. |
| $\begin{pmatrix}3.07\\3.00\end{pmatrix}$±.05 | w. |
| 2.01±.02 | w. |

The parenthesis around lines 3.07 and 3.00 indicate that they are separate and distinct lines, but are often superimposed. These values were determined by standard techniques. The radiation was the K-alpha doublet of copper, and a Geiger counter spectrometer with a strip chart pen recorder was user. The peak heights, I, and the positions as a function of 2 times theta, where theta is the Bragg angle, were read from the spectrometer chart. From these, the relative intensities, 100 $I/I_0$, where $I_0$ is the intensity of the strongest line or peak, and $d$ (obs.), the interplanar spacing in A, corresponding to the recorded lines, were calculated. The intensity in the table above is expressed as follows: m.=medium, w.=weak and v.s.= very strong.

ZSM-11 is similar to ZSM-5 and ZSM-8 with the notable exception that whereas the ZSM-5 and ZSM-8 zeolites contain a doublet at about 10.1, 3.73, 3.00 and 2.01 A. interplaning spacing, ZSM-11 shows a singlet at these values. This means that the crystal class of the ZSM-11 is different from that of the other zeolites. ZSM-11 is tetragonal whereas ZSM-5 and ZSM-8 tend to be orthorhombic.

Ion exchange of the sodium ion with another cation reveals substantially the same pattern with minor shifts in interplanar spacing and variation of relative intensity.

The zeolite of the present invention can be used either in the alkali metal form e.g. the sodium form, the ammonium form, the hydrogen form or another univalent or multivalent cationic form.

Preferably, one or other of the last two forms is employed. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition, impregnated therein or physically intimately admixed therewith. Such component can be impregnated in or on to ZSM-11 such as, for example, by, in the case of platinum, treating the zeolite with a platinum metal-containing ion. Thus, suitable platinum compounds include chloroplatinic acid, platinous chloride and various compounds containing the platinum ammine complex.

The above crystalline zeolite especially in its metal, hydrogen, ammonium, alkylammonium and arylammonium, forms can be beneficially converted to another form by thermal treatment. This thermal treatment is generally performed by heating one of these forms at a temperature of at least 700° F. for at least 1 minute and generally not greater than 20 hours. While subatmospheric pressure can be employed for the thermal treatment, atmospheric pressure is desired for reasons of convenience. It is preferred to perform the thermal treatment in the presence of moisture although moisture is not absolutely necessary. The thermal treatment can be performed at a temperature up to about 1600° F. at which temperature some decomposition begins to occur. The thermally treated product is particularly useful in the catalysis of certain hydrocarbon conversion reactions.

The new zeolite when employed either as an adsorbent or as a catalyst in one of the aforementioned processes should be dehydrated at least partially. This can be done by heating to a temperature in the range of 200 to 600° C. in an atmosphere, such as air, nitrogen, etc. and at atmospheric, subatmospheric or superatmospheric pressures for between 1 and 48 hours. Dehydration can also be performed at room temperature merely by placing the ZSM-11 catalyst in a vacuum, but a longer time is required to obtain a sufficient amount of dehydration.

The new zeolite can be suitably prepared by preparing a solution containing $(R_4X)_2O$, sodium oxide, an oxide of aluminum or gallium, an oxide of silicon or germanium and water and having a composition, in terms of mole ratios of oxides, falling within the following ranges:

TABLE 2

| | Broad | Preferred |
|---|---|---|
| $\dfrac{YO_2}{WO_2}$ | 10-150 | 20-90 |
| $\dfrac{Na_2O}{YO_2}$ | .05-0.7 | 0.05-0.40 |
| $\dfrac{(R_4X)_2O}{YO_2}$ | 0.02-0.20 | 0.02-0.15 |
| $\dfrac{H_2O}{Na_2O}$ | 50-800 | 100-600 | wherein $R_4X$ is a cation of a quaternary compound of an element of Group 5A of the Periodic Table, W is aluminum or gallium and Y is silicon or germanium maintaining the mixture until crystals of the zeolite are formed. Preferably, crystallization is performed under pressure in an autoclave or static bomb reactor. The temperature ranges from 100° C.–200° C. generally, but at lower temperatures, e.g. about 100° C., crystallization time is longer. Thereafter, the crystals are separated from the liquid and recovered. The new zeolite is preferably formed in an aluminosilicate form. The composition can be prepared utilizing materials which supply the appropriate oxide. Such compositions include for an aluminosilicate, sodium aluminate, sodium silicate, silica hydrosol, silica gel, silicic acid and sodium hydroxide. The quaternary compounds can be any element of Group 5A such as nitrogen, phosphorus, arsenic, antimony or bismuth. The compound is generally expressed by the following formula:

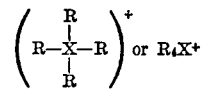

wherein X is an element of Group 5A of the Periodic Table and each R is an alkyl or aryl group having between 1 and 7 carbon atoms. While normally each alkyl or aryl group will be the same, it is not necessary that each group have the same number of carbon atoms in the chain. The oxide of the quaternary metal compound is generally supplied by introducing into the reaction mixture a composition such as tetramethyl, tetraethyl, tetrapropyl or terabutyl metal hydroxide or chloride. In preparing an ammonium species, tetrabutyl ammonium chloride or hydroxide is especially useful. In preparing the phosphonium species of the zeolite, tetrabutylphosphonium chloride is particularly desirable as a means of incorporating the quaternary metal compound in the zeolite. The other metals of Group 5A behave similarly and thus zeolites containing the same can be prepared by the same manipulative procedure substituting the other Group 5A metal for phosphorus. It should be realized that the oxide can be supplied for more than one source. The reaction mixture can be prepared either batchwise or continuously.

Crystal size and crystallization time of the new zeolite composition will vary with the nature of the reaction mixture employed and the crystallization conditions.

Members of the family of new zeolites disclosed and claimed herein can be base exchanged to remove the sodium cations by such ions as hydrogen (from acids), ammonium, alkylammonium and arylammonium including $RNH_3$, $R_3NH^+$, $R_2NH_2^+$ and $R_4N^+$ where R is alkyl or aryl, provided that steric hindrance does not prevent the cations from entering the cage and cavity structure of the new zeolite composition. The hydrogen form of the new zeolite is prepared, for example, by base exchanging the sodium form with, say, ammonium chloride or hydroxide whereby the ammonium ion is substituted for the sodium ion. The composition is then calcined at a temperature of, say, 1000° F. causing evolution of ammonia and retention of a proton in the composition. Other replacing cations include cations of the metals of the Periodic Table, especially metals other than sodium, especially metals of Group II, e.g., zinc and Group VIII of the Periodic Table and rare earth metals and manganese.

Ion exchange of the zeolite can be accomplished conventionally, as by packing the zeolite in the form of beds in a series of vertical columns and successively passing through the beds a water solution of a soluble salt of the cation to be introduced into the zeolite; and then to change the flow from the first bed to a succeeding one as the zeolite in the first bed becomes ion exchanged to the desired extent. Aqueous solutions of mixtures of materials to replace the sodium can be employed. For instance, if desired, one can exchange the sodium with a solution containing a number of rare earth metals suitably in the chloride form. Thus, a rare earth chloride solution commercially available can be used to replace substantially all of the sodium in the as synthesized form of the zeolite. This commercially available rare earth chloride solution contains chlorides of rare earth mixture having the relative composition cerium (as $CeO_2$) 48 percent by weight, lanthanum (as $La_2O_3$) 24 percent by weight, praseodymium (as $Pr_6O_{11}$) 5 percent by weight, neodymium (as $Nd_2O_3$) 17 percent by weight, samarium (as $Sm_2O_3$) 3 percent by weight, gadolinium (as $Gd_2O_3$) 2 percent by weight, and other rare earth oxides 0.8 percent by weight. Didymium chloride is also a mixture of rare earth chlorides, but having a lower cerium content. It consists of the following rare earths determined as oxides: lanthanum 45–65 percent by weight, cerium 1–2 percent by weight, praseodymium 9–10 percent by weight, neodymium 32–33 percent by weight, samarium 5–7 percent by weight, gadolinium 3–4 percent by weight, yttrium 0.4 percent by weight, and other rare earths 1–2 percent by weight. It is to be understood that other mixtures of rare earths are also applicable for the preparation of the novel compositions of this invention, although lanthanum, neodymium, praseodymium, samarium and gadolinium as well as mixtures of rare earth cations containing a predominant amount of one or more of the above cations.

A wide variety of acidic compounds can be employed to prepare the hydrogen form of the new catalyst. These acidic compounds, which are a source of hydrogen ions, include both inorganic and organic acids.

The hydrogen form of the new zeolite can be prepared generally by two methods. The first involves direct ion exchange employing an acid. Suitable acids include both inorganic acids and organic acids. Typical inorganic acids which can be employed include hydrochloric acid, hypochlorous acid, sulfuric acid, sulfurous acid, hydrosulfuric acid, nitric acid, nitrous acid, hyponitrous acid, phosphoric acid, carbonic acid and the like.

Typical organic acids which find utility in the practice of the present invention are the monocarboxylic, dicarboxylic and polycarboxylic acids which can be aliphatic, aromatic or cycloaliphatic in nature.

Representative suitable acids include acetic acid, trichloroacetic acid, bromoacetic, citric acids, maleic, fumaric, itaconic acid, phenylacetic, benzene sulfonic acid and methane-sulfonic and the like.

The second method for preparing a hydrogen form involves first preparing an ammonium for other hydrogen ion precursor form by base exchange and then calcining to cause evolution of the ammonia leaving a hydrogen ion remaining on the zeolite. Suitable compounds for preparing the hydrogen ion precursor form include ammonium compounds such as ammonium chloride, ammonium bromide, ammonium iodide, ammonium bicarbonate, ammonium sulfate, ammonium citrate, ammonium borate, ammonium palmatate and the like. Still other ammonium compounds which can be employed include quaternary ammonium compounds such as tetramethylammonium hydroxide and trimethylammonium chloride.

The wide variety of metallic compounds can be employed with facility as a source of metallic cations include both inorganic and organic salts for the metals of Groups I through VIII of the Periodic Table.

While water will ordinarily be the solvent in the base exchange solutions employed, it is contemplated that other solvents, although generally less preferred, can be used in which case it will be realized that the above list of exchange compounds can be expanded. Thus, in addition to an aqueous solution, alcohol solutions and the like of the exchange compounds can be employed in producing the exchanged catalyst of the present invention. Generally, the alkali metal content is reduced to less than 4 percent by weight and preferably less than 1 weight percent. When the exchanged zeolite is prepared, it is generally, thereafter, treated with a suitable solvent, e.g. water, to wash out any of the anions which may have become temporarily entrained or caught in the pores or cavities of the crystalline composition.

As indicated above, the aluminosilicates prepared by the instant invention are formed in a wide variety of particular sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as extrusion, the aluminosilicate can be extruded before drying or dried or partially dried and then extruded.

In the case of many catalysts, it is desired to incorporate the new zeolite with another material resistant to the temperatures and other conditions employed in organic conversion processes. Such materials include active and inactive materials and synthetic or naturally occurring zeolites as well as inorganic materials such as clays, silica and/or metal oxides. The latter may be either naturally occurring or in the form of gelatinous precipitates or gels including mixtures of silica and metal oxides. Use of a material in conjunction with the new zeolite, i.e. combined therewith which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Normally, zeolite materials have been incorporated into naturally-occurring clays, e.g. bentonite and kaolin, to improve the crush strength of the catalyst under commercial operating conditions. These materials, i.e. clays, oxides, etc., function as binders for the catalyst. It is desirable to provide a catalyst having good crush strength because in a petroleum refinery the catalyst is often subjected to rough handling, which tends to break the catalyst down into powder-like materials which cause problems in processing. These clay binders have been employed normally only for the purpose of improving the crush strength of the catalyst.

Naturally-occurring clays which can be composited with the new zeolite ZSM-11 catalyst include the montmorillonite and kaolin family, which families include the sub-bentonites, and the kaolines commonly known as Dixie McNamee-Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the ZSM-11 catalyst also include inorganic oxides, notably alumina.

In addition to the foregoing materials, the ZSM-11 catalyst can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. The relative proportions of finely divided crystalline aluminosilicate ZSM-11 and inorganic oxide gel matrix vary widely with the crystalline aluminosilicate content ranging from about 1 to about 90 percent by weight and more usually, particularly when the composite is prepared in the form of beads, in the range of about 2 to about 50 percent by weight of the composite.

Employing the catalyst of this invention, containing a hyrogenation component, heavy petroleum residual stocks, cycle stocks, and other hydrocrackable charge stocks can be hydrocracked at temperatures between 400° F. and 825° F. using molar ratios of hydrogen to hydrocarbon charge in the range between 2 and 80. The pressure employed will vary between 10 and 2,500 p.s.i.g. and the liquid hourly space velocity between 0.1 and 10.

Employing the catalyst of this invention for catalytic cracking, hydrocrabon cracking stocks can be cracked at a liquid hourly space velocity between about 0.5 and 50, a temperature between about 550° F. and 1100° F., a pressure between about subatmospheric and several hundred atmospheres.

Employing a catalytically active form of a member of the family of zeolites of this invention containing a hydrogenation component, reforming stocks can be reformed employing a temperature between 700° F. and 1000° F. The pressure can be between 100 and 1000 p.s.i.g., but is preferably between 200 and 700 p.s.i.g. The liquid hourly space velocity is generally between 0.1 and 10, preferably between 0.5 and 4 and the hydrogen to hydrocarbon mole ratio is generally between 1 and 20, preferably between 4 and 12.

The catalyst can also be used for hydroisomerization of normal paraffins when provided with a hydrogenation component, e.g. platinum. Hydroisomerization is carried out at a temperature between 200 to 700° F., preferably 300 to 550° F., with a liquid hourly space velocity between 0.01 and 2, preferably between 0.25 and 0.50 employing hydrogen such that the hydrogen to hydrocarbon mole ratio is between 1:1 and 5:1. Additionally, the catalyst can be used for olefin isomerization employing temperatures between 30° F. and 500° F.

Other reactions which can be accomplished employing the catalyst of this invention containing a metal, e.g. platinum, include hydrogenation-dehydrogenation reactions and desulfurization reactions.

In order to more fully illustrate the nature of the invention and the matter of practicing the same, the following examples are presented:

EXAMPLE 1

90 grams of sodium silicate, one gram of sodium aluminate and 168 grams of $H_2O$ were mixed in a blender. Approximately 9.9 grams of sulfuric acid (98 percent $H_2SO_4$) was added to the mixture to adjust the pH below 10. Then 11 grams of tetra butyl phosphonium chloride in 152 grams of $H_2O$ was added slowly. The mixture turned into an opaque gel. The gel was heated to 120° F. in a water bath for two hours, then in an autoclave at 300° F. for 88 hours. The product was crystalline and has the X-ray diffraction pattern of Table 1 above. Chemical analysis is as follows, in terms of mole ratios of oxides:

| | |
|---|---|
| $Al_2O_3$ | 1.00 |
| $SiO_2$ | 48.00 |
| $Na_2O$ | 0.52 |
| $(TBP)_2O$ [1] | .066 |

[1] Tetra butyl phosphonium cation calculated from P analysis.

The product had the following X-ray diffraction pattern wherein $I/I_0$ indicates the relative intensity:

TABLE 3

| Interplanar spacing $d$ (A.) | Relative intensity $I/I_0$ |
|---|---|
| 11.19 | 27 |
| 10.07 | 23 |
| 7.50 | 2 |
| 7.25 | 1 |
| 7.11 | 1 |
| 6.73 | 3 |
| 6.42 | 2 |
| 6.33 | 2 |
| 6.09 | 3 |
| 6.03 | 5 |
| 5.75 | 2 |
| 5.61 | 5 |
| 5.16 | 1 |
| 5.03 | 3 |
| 4.62 | 4 |
| 4.48 | 1 |
| 4.37 | 9 |
| 4.28 | 2 |
| 4.08 | 2 |
| 4.00 | 4 |
| 3.86 | 100 |
| 3.73 | 39 |
| 3.68 | 5 |
| 3.49 | 6 |
| 3.41 | 3 |
| 3.35 | 5 |
| 3.27 | 1 |
| 3.19 | <1 |
| 3.14 | <1 |
| 3.07 | 6 |
| 3.00 | 10 |
| 2.87 | 2 |
| 2.80 | <1 |
| 2.62 | 3 |
| 2.56 | 1 |
| 2.51 | 2 |
| 2.50 | 4 |
| 2.46 | 1 |
| 2.42 | 2 |
| 2.40 | 2 |
| 2.35 | 2 |
| 2.28 | <1 |
| 2.24 | <1 |
| 2.21 | <1 |
| 2.18 | <1 |
| 2.14 | <1 |
| 2.12 | 2 |
| 2.09 | 2 |
| 2.08 | 2 |
| 2.01 | 21 |
| 1.99 | 2 |
| 1.97 | 4 |
| 1.93 | 5 |
| 1.88 | 7 |
| 1.85 | 1 |
| 1.82 | 1 |
| 1.78 | 3 |
| 1.76 | 2 |
| 1.74 | 1 |
| 1.72 | 1 |

TABLE 3—Continued

| Interplanar spacing d (A.) | Relative intensity I/I₀ |
|---|---|
| 1.71 | 1 |
| 1.68 | 7 |
| 1.63 | 1 |
| 1.62 | 2 |
| 1.60 | <1 |
| 1.57 | 1 |
| 1.65 | 1 |

EXAMPLE 2

The final gel mixture in Example 1 was heated in a steam bath (~220° F.) for 9 days. The product has the same X-ray diffraction pattern and chemical analysis as the product of Example 1.

EXAMPLE 3

Example 1 was repeated except that the preheat step was eliminated. The mixture crystallized after heating at 300° F. in an autoclave for 66 hours. The product gave the X-ray pattern of Table 1. Chemical analysis is as follows, in terms of mole ratios of oxides:

$Al_2O_3$ ---------------------------------- 1.00
$SiO_2$ ------------------------------------ 50.0
$Na_2O$ ----------------------------------- 0.36
$(TBP)_2O$ [1] ---------------------------- 0.69

[1] Tetrabutyl phosphonium cation calculated from P analysis.

EXAMPLE 4

Different phosphonium compounds were used. 50 grams of sodium silicate and one gram of sodium aluminate and 108 grams of water were mixed in a blender. 2.5 grams of $H_2SO_4$ was added. Then 6.5 grams of benzyl triphenyl phosphonium chloride in 40 grams of $H_2O$ was added slowly. Crystallization was carried out in an autoclave at 300° F. for 4 days. The product gave the X-ray pattern of Table 1 above.

EXAMPLE 5

Different forms of silica can be used as the silicon source of this invention. The following components were mixed together in a blender in the following sequence:

(1) 88 grams of fine colloidal $SiO_2$ (30 percent)
(2) 1.2 grams of sodium aluminate
(3) 11 grams of tetra butyl phosphonium chloride
(4) 250 grams of $H_2O$
(5) 2.4 grams of NaOH.

The mixture appeared as a very dilute colloidal suspension. Crystallization was conducted at 500° F. for 67 hours. The product gave the X-ray pattern of Table 1.

EXAMPLE 6

This zeolite can be used as absorbent and catalyst in is original form (sodium-TBP form), ion exchanged form, e.g. exchanged zinc form and/or calcined ammonium form. The latter form was prepared by exchanging 20 grams of the product of Example 3 with 200 ml. of 1 N $NH_4Cl$ solution at 180° F. for four 1-hour periods. The exchanged zeolite was then washed chloride free and dried at 210° F. Thereafter, it was calcined in a muffle at 1000° F. for 1 hour. The structure of the zeolite crystal remained unchanged after calcination as shown by the X-ray pattern.

EXAMPLE 7

The calcined ammonium form of Example 6 has shown good activity in the cracking of n-hexane. The results have shown that at 900° F. the $n-C_6H_{14}$ conversion were 24.2 and 31.8 percent by weight at 5 minutes and 25 minutes respectively. The alpha values determined in accordance with the method described by P. B. Weisz and J. N. Miale in Journal of Catalysis, vol. 4, No. 4, August 1965, pp. 527–9 were 39 and 54 at 5 minutes and 25 minutes.

ZSM–11 appears to have an effective free aperture for the portuals controlling access to the intracrystalline void volume of about 7 A. Under test conditions, m-xylene, m-diethyl benzene, 2-methyl naphthalene and 1,2, 4-trimethyl-benzene were selectively sorbed while o-diethyl benzene and 1-methyl naphthalene were excluded. This indicates that ZSM–11 is effective as a shape selective catalyst in preferentially sorbing one isomer from another. A summary of the shape selective sorption properties of the hydrogen form of ZSM–11 is set forth below.

Examination of the sorption properties of a sample of as synthesized ZSM–11 activated at 400° C. in He shows that almost all of the intracrystalline void volume in ZSM–11 is initially occupied by the $P(C_4H_9)_4^+$ ions. The intracrystalline void volume defined by the $PR_4^+$ ions—assuming an ionic diameter of 9.8 A.—is about 0.12 ml./g. The weight losses occurring above 400° C. in $O_2$ and 500° C. in the He—9.6 and 10.3 weight percent respectively—agree closely with that calculated for complete decomposition of the $P(C_4H_9)_4^+$ ions, namely 9.9 weight percent.

Zeolite ZSM–11 activated at 600° C. in He exhibits intracrystalline sorption of cyclohexane (critical diameter about 6 A.) at 25° C. and 20 mm. Hg. Access to the main pore system in ZSM–11 apparently occurs through relatively large windows, probably comprised of at least 12 tetrahedra. 2,2-dimethylbutane was sorbed at a somewhat slower rate than cyclohexane. The free void volume defined by cyclohexane in ZSM–11 is similar to that formerly occupied by the $P(C_4H_9)_4$ ions—namely 0.09 ml./g. and 0.12 ml./g., respectively. The intracrystalline void volume available to $n-C_6H_{14}$ (critical diameter about 4.6 A.) is much larger than that defined by cyclohexane—0.18 and 0.09 ml./g., respectively. Intracrystalline molecular sieving between $n-C_6H_{14}$ and cyclohexane shows the presence of a dual pore system in which access to the small pore system is probably controlled by 8-membered rings such as found in gmelinite cages. The apparent free void volume defined by $H_2O$ is considerably lower than that defined by $n-C_6H_{14}$—0.11 and 0.18 ml./g., respectively. In ZSM–11 the fractional void volume defined by $H_2O$ is equivalent to that defined by cyclohexane. One possible explanation is that $H_2O$ under the existing experimental conditions (25° C., 12 mm.) did not penetrate the secondary small-pore system present in high-silica zeolites such as ZSM–11.

EXAMPLE 8

Three solutions, as follows, were prepared:

| | Grams |
|---|---|
| Solution A: | |
| Sodium aluminate (41.8 percent $Al_2O_3$, 31.6 percent $Na_2O$) | 1.2 |
| NaOH | 3.5 |
| Solution B: | |
| Tetrabutylammonium iodide | 35.2 |
| $H_2O$ | 170 |
| Solution C: | |
| Colloidal silica ("Ludox" 29.5 weight percent $SiO_2$) | 100 |

From the solutions, a zeolite was prepared. Solution A was added to Solution B and the two were mixed together.

Thereafter, Solution C was added and mixed for 10 minutes. It was transferred to a polypropylene jar and maintained for 23 days at 212° F. until a product crystallized.

The composition of the reaction mixture, in terms of mole ratios, was as follows:

$$\frac{OH^-}{SiO_2} = 0.202$$

$$\frac{Tetrabutylammonium}{Tetrabutylammonium\ plus\ sodium} = 0.489$$

$$\frac{H_2O}{OH^-} = 134$$

$$\frac{SiO_2}{Al_2O_3} = 100$$

The product was filtered, washed with water and dried at 230° F. It had an X-ray diffraction pattern set forth in Table 4. After it was calcined for 24 hours at 1000° F. its sorption properties were determined. It was found to sorb 7.3 weight percent cyclohexane, 8.9 weight percent normal hexane and 7.0 weight percent water under the sorption conditions above reported. Chemical analysis of the product showed the $SiO_2/Al_2O_3$ ratio to 73.

TABLE 4

| Example 8 | | Example 8 calcined for 20 hr. at 550° C. | |
|---|---|---|---|
| dA: | I/I₀ | dA: | I/I₀ |
| 11.19 | 29 | 11.19 | 80 |
| 10.10 | 23 | 10.10 | 54 |
| 9.36 | 58 | | |
| 7.50 | 3 | 7.47 | 2 |
| 6.76 | 3 | | |
| 6.44 | 2 | 6.42 | 3 |
| 6.03 | 5 | 6.01 | 16 |
| 5.61 | 4 | 5.57 | 9 |
| 5.15 | 1 | 5.01 | 6 |
| 4.62 | 5 | 4.61 | 4 |
| 4.39 | 9 | 4.37 | 6 |
| 3.87 | 100 | 3.86 | 100 |
| 3.74 | 43 | 3.73 | 33 |
| 3.69 | 1 | 3.69 | 1 |
| 3.50 | 5 | 3.49 | 6 |
| 3.36 | 8 | 3.34 | 7 |
| 3.11 | 3 | | |
| 3.07 | 6 | 3.06 | 7 |
| 3.00 | 11 | 2.98 | 12 |
| 2.88 | 3 | 2.86 | 1 |
| 2.80 | 2 | 2.79 | 1 |
| 2.62 | 5 | 2.62 | 4 |
| 2.50 | 7 | 2.50 | 4 |
| 2.36 | 3 | 2.34 | 4 |
| 2.19 | <1 | | |
| 2.01 | 21 | 2.01 | 9 |
| 1.88 | 6 | 1.87 | 2 |
| 1.78 | 2 | 1.77 | 1 |
| 1.68 | 6 | 1.66 | 2 |

EXAMPLE 9

The product from Example 8 was calcined for 10 hours at 1000° F. and then contacted, while stirring, with NH₄Cl solution (12 grams NH₄Cl dissolved in 228 cc. H₂O) at room temperature for one hour which was followed by filtering. This exchange was repeated twice more. It was then water washed free of chloride ions and dried at 230° F. The dried crystalline aluminosilicate was pelleted and sized 4–10 mesh (U.S. sieve) and recalcined by heating at 1000° F. for 10 hours. The calcined catalyst was evaluated for catalytic cracking conditions at 20 LHSV, 0.3 catalyst/oil ratio and 875° F. The charge was an Amal gas oil having a boiling range of 650–1000° F. and a pour point of 100° F.

Catalytic results for the cracking of the Amal gas oil are summarized in the following table:

TABLE 5

Conversion, vol. percent: 49.8
C₅+ gasoline, vol. percent: 27.4
Total C₄'s vol. percent: 15.9
Dry gas, wt. percent: 11.8
Coke, wt. percent: 0.5
H₂, wt. percent: 0.05

| C₁–C₅ distribution | Wt. | Vol. |
|---|---|---|
| C₁ | 0.12 | |
| C₂⁼ | 1.48 | |
| C₂ | 0.32 | |
| C₃⁼ | 5.25 | |
| C₃ | 4.59 | |
| C₄⁼ | 5.13 | 7.31 |
| iC₄ | 2.33 | 3.47 |
| nC₄ | 3.00 | 5.08 |
| C₅⁼ | 2.13 | 2.82 |
| iC₅ | 0.84 | 1.15 |
| nC₅ | 0.87 | 1.20 |

The high yield of olefins ($C_2$–$C_5$) indicate that the catalyst is effective for the cracking of normal paraffinic components contained in the gas oil. The substantially lower pour point of the 410+ products confirms that the crystalline aluminosilicate selectively cracks out the higher pour components in the high pour point (100° F.) Amal gas oil employed as indicated by the following table:

| Product fractions: | Pour point, ° F. |
|---|---|
| 410+ | 5 |
| 410–650 | −30 |
| 650+ | 20 |

The foregoing demonstrates that the ZSM–11 catalyst of the present invention, prepared either employing tetrabutylammonium or a tetrabutyl metal compound is, in a catalytic form, useful for catalytic dewaxing to improve the octane value of charge stocks so cracked. By cracking normal paraffinic contents without cracking isoparaffins, the resultant liquid effluent has a higher octane value.

EXAMPLE 10

Example 8 was repeated except that the amount of sodium aluminate was 3.0 grams, the amount of sodium hydroxide 15.0 grams and the amount of water 640 grams. The amount of colloidal silica was 375 grams and tetrabutylammonium bromide was employed. The amount of tetrabutylammonium bromide was 75 grams. The crystalline product which was crystallized in a polypropylene jar by subjecting it to 212° F. for 23 days was found to have an X-ray diffraction pattern substantially that of Table 1 above.

I claim:

1. A method of converting a hydrocarbon charge which comprises contacting a convertible hydrocarbon charge under hydrocarbon conversion conditions with a catalytically-active form of a crystalline aluminosilicate zeolite having a composition in terms of mole ratios of oxides as follows:

$$0.9 \pm 0.3 M_{2/n}O : Al_2O_3 : 20\ to\ 90\ SiO_2 : zH_2O$$

wherein M is at least one cation, $n$ is the valence of said cations, and $z$ is from 6 to 12, said zeolite belonging to the tetragonal system and having the X-ray diffraction values set forth in Table 1 of the specification, with a singlet at values 10.1, 3.73, 3.00 and 2.01, and products of thermal treatment of said aluminosilicate, said thermal treatment comprising heating the same at a temperature of at least about 700° F. up to about 1600° F. for at least one minute.

2. A method of converting a hydrocarbon charge which comprises contacting a convertible hydrocarbon charge under hydrocarbon conversion conditions with a catalytically-active form of a crystalline aluminosilicate zeolite having a composition in terms of mole ratios of oxides as follows:

$$0.9 \pm 0.3 M_{2/n}O : Al_2O_3 : 20 \text{ to } 90\ SiO_2 : zH_2O$$

wherein M is hydrogen, ammonium, or a metal of Groups II–VIII of the Periodic Table or mixtures thereof, $n$ is the valence of said cations, and $z$ is from 6 to 12, said zeolite belonging to the tetragonal system and having the X-ray diffraction values set forth in Table 1 of the specification, with a singlet at values 10.1, 3.73, 3.00 and 2.01, and products of thermal treatment of said aluminosilicate, said thermal treatment comprising heating the same at a temperature of at least abou 700° F. up to about 1600° F. for at least one minute.

3. A method of cracking a hydrocarbon cracking stock comprising molecules which can be cracked to molecules of lower average molecular weight which comprise contacting said hydrocarbon cracking stock with a catalytically-active form of the zeolite of claim 1 at a temperature between 550° F. and 1100° F., a pressure between subatmospheric and several hundred atmospheres and a liquid hourly space velocity between 0.5 and 50.

4. A method of cracking a hydrocarbon cracking stock comprising molecules which can be cracked to molecules of lower average molecular weight which comprise contacting said hydrocarbon cracking stock with a catalytically-active form of the zeolite of claim 2 at a temperature between 550° F. and 1100° F., a pressure between subatmospheric and several hundred atmospheres and a liquid hourly space velocity between 0.5 and 50.

5. A method of hydrocracking a hydrocrackable hydrocarbon stock comprising molecules which can be cracked in the presence of hydrogen to yield products having lower average molecular weight which comprise contacting said hydrocracking stock with a catalytically-active form of the zeolite composition of claim 1 containing a hydrogenation component at temperatures between 400° F. and 825° F. in the presence of hydrogen such that the molar ratio of hydrogen to hydrocarbon is in the range between 2 and 80, under a pressure between 10 and 2500 p.s.i.g. at a liquid hourly space velocity between 0.1 and 10.

6. A method of hydrocracking a hydrocrackable hydrocarbon stock comprising molecules which can be cracked in the presence of hydrogen to yield products having lower average molecular weight which comprise contacting said hydrocracking stock with a catalytically-active form of the zeolite composition of claim 2 containing a hydrogenation component at temperatures between 400° F. and 825° F. in the presence of hydrogen such that the molar ratio of hydrogen to hydrocarbon is in the range between 2 and 80, under a pressure between 10 and 2500 p.s.i.g. at a liquid hourly space velocity between 0.1 and 10.

References Cited
UNITED STATES PATENTS

| | | | |
|---|---|---|---|
| 2,882,243 | 4/1959 | Milton | 423—329 |
| 3,054,657 | 9/1962 | Breck | 423—329 |
| 3,216,789 | 11/1965 | Breck et al. | 423—329 |
| 3,248,170 | 4/1966 | Kvetinskas | 423—328 |
| 3,014,871 | 12/1961 | Fulton et al. | 252—49.7 |
| 3,306,922 | 2/1967 | Barrer et al. | 260—448 R |
| 3,308,069 | 3/1967 | Wadlinger et al. | 252—455 R |
| 3,314,752 | 4/1967 | Kerr | 252—430 |
| 3,431,219 | 3/1969 | Argaver | 252—455 Z |
| 3,459,676 | 8/1969 | Kerr | X423—329 |

DELBERT E. GANTZ, Primary Examiner

G. E. SCHMITKONS, Assistant Examiner

U.S. Cl. X.R.

208—DIG. 2, 120, 209; 252—455 Z